Patented Aug. 22, 1933

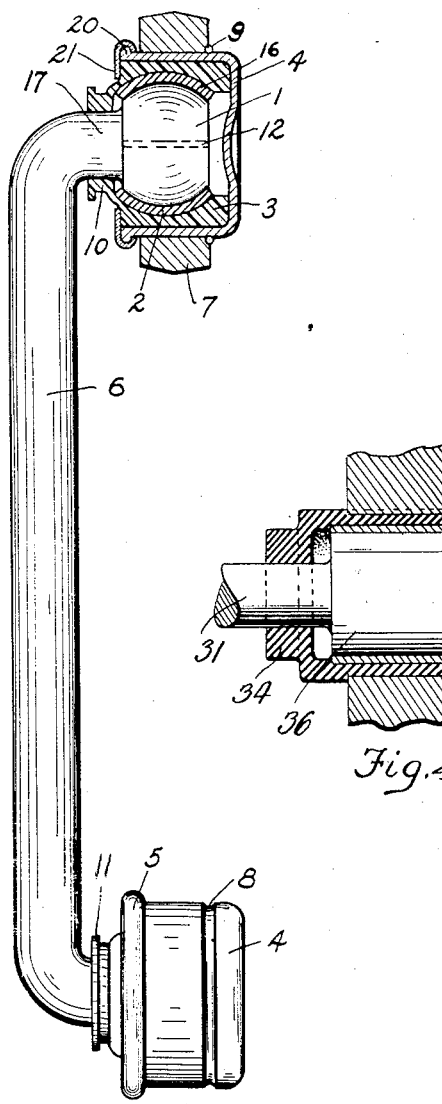

1,923,601

UNITED STATES PATENT OFFICE 1,923,601

NONMETALLIC CONNECTION

Elverton W. Weaver, Cleveland Heights, Ohio, assignor to The Columbia Axle Company, Cleveland, Ohio, a Corporation of Ohio Application May 16, 1930. Serial No. 452,976

3 Claims. (Cl. 287—90)

This invention, relating, as indicated, to a non-metallic connection, is more particularly directed to a joint which is adapted to receive irregular and intermittent use as distinguished from ball and roller bearings which receive more severe and continuous use. The joint of my novel construction may be utilized in a number of places, particularly tie rods, shock absorbers, drag links, push rods and other similar parts found upon an automobile, however, the invention is not restricted to an automobile but may be used as a connection in any mechanism where desired.

Heretofore, the above named joints usually comprised a metal ball having a shank, the ball being received in a relatively close fitting socket. In order to maintain this type of joint tight so that no vibration resulted, it was necessary to accurately machine the engaging surfaces and also to provide an efficient means of lubrication. However, in spite of all these precautions the metal to metal joints rapidly wore out, causing play in the joint which is extremely dangerous because of the liability of snapping the parts upon sudden movement and they became noisy, which is also highly objectionable. The provision of lubricating means in these joints as well as the accurate fitting of the parts involved a great expense, especially when it is remembered that even upon one automobile there are a number of such joints. The joints of the prior devices were also objectionable because of the frequent necessity for lubrication which is often overlooked by the average motor car operator. As far as I am aware the provision of a vibratory joint and one which required no lubrication is a problem that has not been solved heretofore.

A further disadvantage of connections heretofore used was the danger of electrolytic action setting up and its consequent deterioration of the joint. The only way in which this action can be avoided is to provide the structure with an absolute seal against the entrance of water.

In the present invention I have aimed to provide a sealed joint of such type that no water can enter, and one which will wear practically indefinitely without the necessity of lubrication. It is also an object of this invention to provide a joint of materially lower cost than the conventional joints now in vogue.

To the accomplishment of the foregoing and related ends, said invention, then, consists of the means hereinafter fully described and particularly pointed out in the claims; the annexed drawing and the following description setting forth in detail one method and one product exemplifying my invention, such disclosed procedure and product constituting, however, but one of various applications of the principle of my invention.

In said annexed drawing:—

Fig. 1 is an end elevation of parts in section; Fig. 2 is a side elevation with a section through the upper center portion taken transversely to the section of Fig. 1; Fig. 3 is a modification showing the joint connected to the chassis of an automobile; and Fig. 4 is a transverse central section showing a modification of my improved connection.

Referring now to the drawing, a drag link 6 is shown having a shank 17 and a headed ball 1, which portion is similar to the ball of a ball and socket joint. The ball 1 is surrounded by a bearing element which is split into halves 2 and 16, the material of which the bearing element is composed being fibre preferably. This fibre may have its face glazed in order to provide a bearing surface, or the said surface may be impregnated with a suitable lubricant such as graphite in order that the ball can move freely with respect to the bearing element without causing wear upon such element. The bearing element may be made up in halves or in full circle form the important feature being that the diameter of the element is approximately the same as that of the ball 1 so that when the two halves 2 and 16 are placed about the ball a void or split 12 results, into which the surrounding material flows so as to anchor the bearing element into such surrounding material. The outer surface or circumference of the bearing element may be roughened (not shown) so as to further anchor said element to the before mentioned surrounding material. This surrounding material 3, which is in the form of a lining, is of soft compressible material and may be soft rubber. The interior surface of this lining 3 as shown is spherical and is concentric with the ball 1 and the bearing element 2 and 16. The outer portion of the lining 3 takes the form of a sealing collar 10 which may have a shoulder 11 rising therefrom, this collar having an interior cylindrical surface, the diameter of which is slightly less than that of the shank portion 17, in order that the collar may grip said shank portion tightly and thus seal the joint. The lining 3 has an outer circumference cylindrical in form and of such dimensions that it fits snugly within a cup shaped retainer 4. The cup 4 is made of some strong material such as steel, and in turn fits within an opening in the arm 7, it being held in place in such opening by a snap ring 9, the said snap ring encircling the cup in the groove 8 so that inward movement of the cup is prevented. The lining 3 is held in the cup by means of a cap member 5 which engages the shoulder 20 on said cup, and presses upon the lining 3 and forces it inwardly thereby maintaining the lining under compression at all times. The cap also has a further function, namely, preventing any outward movement of the cup so that in conjunction with the snap ring 9 a positive means of locking the cup in place is obtained. The cap 5 engages the portion 18 of the lining 3, which portion may become slightly distorted, and as the portion 18 is forced inwardly it will be seen that the collar portion 10 will ride in upon the shank 17 and thus prevent the entrance of any liquid regardless of the amount of pressure exerted by the cap. I have shown a cap 5 for the purpose of compressing the lining and locking the cup, but it will be understood by those skilled in the art that a screw threaded cap member may be used and will be especially advantageous where frequent adjustment of the pressure is necessary. This cap member may be either externally or interiorly engaged with the cup depending upon the particular place at which the joint is to be used. The lower portion of Fig. 1 is similar in every respect to the upper, with the sole exception that it is turned through 90°, such positioning being dependent upon the element with which it is engaged.

A modification of my improved joint is shown in Fig. 3 which is especially adapted for shock absorber connections, and this joint illustrates the connection to a chassis. The cup in this instance is secured to the chassis 14 by means of headed bolt 15 and nut 19 in engagement therewith, the remaining elements functioning in exactly the same manner as the corresponding elements in Fig. 1.

The joint is assembled as follows:—

The bearing elements 2 and 16 are placed in the lining 3 and then the collar 10 of the lining is forced over the ball 1 until a snug engagement is had between the bearing elements and the ball. The assembled ball and lining are then forced into the cup 4 whereupon the cap 5 is clamped upon the shoulder 20 in such a manner that the lip 21 of the cap places the lining under compression. The joint is now ready for insertion in a connecting member 13, and after such placement the snap ring 9 is forced into the groove 8 and the joint is now locked in position ready for use.

In the construction shown in Fig. 4 there are two members 30 and 31 which it is desired to connect and which may be accomplished by the use of a connection consisting of a non-metallic compressible resilient element 32 having a central cylindrical portion 33 and end portions 34 and 35 of reduced internal diameter. This intermediate element, which may conveniently be formed of rubber, is stretched over the enlarged central portion 36 of the member 31 and the portions 34 and 35 are of such a diameter that when engaged upon the ends of the member 31 they are expanded slightly, causing them to grip this member firmer and seal the same against the introduction of any foreign material between the two members. Similarly, the exterior of the central portion 33 of the member 32 is formed of a larger diameter than the interior of the member 30 so that in the engagement shown there is a snug grip of the member 32 against the member 30.

This construction permits a rotation or oscillation of the member 31 within the member 30 and also allows of a slight tilting of one member with respect to the other. For example, such a construction might be employed in the connection between spring ends and the chassis of a motor vehicle in which there is sometimes a need for a slight tiltable movement between these two parts.

In either of the constructions shown it will be observed that I have now found in a single element a means for yieldably connecting two metallic elements while permitting slight movement in various directions. At the same time the single element thus interposed is firmly secured or pressed against both of the two elements to be connected in such a way as to prevent the introduction of any injurious material, such as dirt, water, grit or the like.

From the above description it will be noted that I have provided a joint which is adapted to be used in any place where a ball joint is wanted and that the novel joint has many other uses, such as shock absorber connections as well as spring connections, drag links and push rods, the important advantages of my improved construction being low cost of manufacture and permanency. The joint when used in the manner described will last practically indefinitely, the only attention that is necessary being adjustment of the pressure on the lining, it being understood that such adjustment is not necessary in all cases. It will also be seen that any electrolytic action which usually results from the joints now in use is obviated by reason of the tight gripping collar 10 which absolutely prevents the entrance of any water and provides an absolute seal. As a further and important advantage it will be noted that the necessity for frequently lubrication is done away with, which in the present-day joints involves the cost of lubricant as well as the cost of lubricant-containing accessories. A further and well recognized objection to the present lubricated joints is that the average motor car operator fails to lubricate them at the proper times, which objection is not present in the instant case.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. A joint comprising a ball, a socket, a soft compressible lining therefor, and a bearing element, said bearing element being interposed between said ball and said lining, said ball having a shank, and said lining extending outwardly to form a collar about said shank.

2. A joint comprising a ball, a socket, a soft compressible lining therefor, and a bearing element, said bearing element being interposed between said ball and said lining, said lining being of greater depth normally than said socket, and a cap holding said lining within said socket and under compression, said ball having a shank, and said lining extending outwardly to form a collar about said shank.

3. A joint comprising a ball, a socket, a soft compressible lining therefor, and a bearing element, said bearing element being interposed between said ball and said lining, said lining being of greater depth normally than said socket, and a cap holding said lining within said socket and under compression, said ball having a shank, and said lining extending outwardly to form a collar about said shank, said collar sealing said joint.

ELVERTON W. WEAVER.